United States Patent
Kosugi et al.

(10) Patent No.: US 7,394,974 B2
(45) Date of Patent: Jul. 1, 2008

(54) SYSTEM AND METHOD FOR ASSOCIATING PRESENTED DIGITAL CONTENT WITHIN RECORDED DIGITAL STREAM AND METHOD FOR ITS PLAYBACK FROM PRECISE LOCATION

(75) Inventors: Takuya Kosugi, San Diego, CA (US); Shyh-Jye Anthony Chen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 933 days.

(21) Appl. No.: 10/830,996

(22) Filed: Apr. 22, 2004

(65) Prior Publication Data
US 2005/0163476 A1 Jul. 28, 2005

Related U.S. Application Data

(60) Provisional application No. 60/539,297, filed on Jan. 26, 2004.

(51) Int. Cl.
H04N 7/64 (2006.01)
(52) U.S. Cl. .................................................. 386/113
(58) Field of Classification Search ................... 386/46, 386/83, 95, 109–113, 124–126
See application file for complete search history.

(56) References Cited

U.S. PATENT DOCUMENTS

| | | | |
|---|---|---|---|
| 5,477,397 A | 12/1995 | Naimpally et al. | 360/10.3 |
| 5,613,032 A | 3/1997 | Cruz et al. | 386/69 |
| 6,104,861 A | 8/2000 | Tsukagoshi | 386/95 |
| 6,188,831 B1 | 2/2001 | Ichimura | 386/69 |
| 6,393,158 B1 | 5/2002 | Gould et al. | 382/254 |
| 6,445,738 B1 | 9/2002 | Zdepski et al. | 375/240.01 |
| 6,621,980 B1 | 9/2003 | Gould et al. | 386/69 |
| 6,912,352 B2 * | 6/2005 | Ohara et al. | 386/111 |
| 7,231,516 B1 * | 6/2007 | Sparrell et al. | 713/156 |
| 2003/0002578 A1 | 1/2003 | Tsukagoshi et al. | 375/240.01 |
| 2003/0035650 A1 | 2/2003 | Demas et al. | 386/112 |
| 2003/0040962 A1 | 2/2003 | Lewis | 705/14 |
| 2003/0063893 A1 | 4/2003 | Read | 386/46 |
| 2003/0118321 A1 | 6/2003 | Sparrell et al. | 386/68 |
| 2003/0170003 A1 | 9/2003 | Levesque et al. | 386/68 |
| 2003/0202775 A1 | 10/2003 | Junkersfeld et al. | 386/68 |
| 2003/0202776 A1 | 10/2003 | Kendall et al. | 386/94 |

* cited by examiner

*Primary Examiner*—Thai Tran
*Assistant Examiner*—Mishawn Dunn
(74) *Attorney, Agent, or Firm*—John L. Rogitz

(57) ABSTRACT

To avoid discontinuities when resuming play of a video stream that was paused while being viewed live and being simultaneously recorded, the timestamp and video stream time base discontinuity count associated with the last-viewed frame are used to access the frame in storage that has the same discontinuity count (indicating that it is in the same segment as the last-viewed frame) and a timestamp one greater than the timestamp of the last-viewed frame.

15 Claims, 2 Drawing Sheets

SYSTEM AND METHOD FOR ASSOCIATING PRESENTED DIGITAL CONTENT WITHIN RECORDED DIGITAL STREAM AND METHOD FOR ITS PLAYBACK FROM PRECISE LOCATION

RELATED APPLICATION

This application claims priority from U.S. provisional patent application Ser. No. 60/539,297, filed Jan. 26, 2004.

FIELD OF THE INVENTION

The present invention relates generally to television systems.

BACKGROUND

A user of a personal video recorder (PVR) conveniently may record a video stream at the same time the user is viewing the stream live, i.e., as the stream is being received by the user's television system. If the user desires to leave the room but not miss any part of the program being recorded, the user may manipulate a remote control device to cause the system to "pause", i.e., to freeze a frame on the TV display while continuing to record the program.

When the user wants to resume viewing the program, he again manipulates the remote control device to cause play to resume (e.g., by pressing a "play" button on the remote device). However, current solutions to providing for a smooth transition in the video from "pause" to resumed play have drawbacks, which can be better understood after the following brief discussion.

Digital multimedia streams may be sent to receivers in a format known as Moving Pictures Expert Group (MPEG) standards such as MPEG-1, MPEG-2 (also used for DVD format), MPEG-4 and other block based transform codecs. In MPEG formatting, the data is encoded using MPEG principles, sent to the receiver, and then decoded at the receiver.

As recognized herein, MPEG frames may have timestamps (sometimes referred to as presentation timestamps, or PTS for short) that can be used to identify the frames. As also understood herein, however, a PTS may not be unique, because MPEG streams can undergo time base discontinuities between frame segments, after which PTS numbers can repeat. Accordingly, while a PTS value identifies a frame within a segment, it does not necessarily uniquely identify the frame within the entire stream.

With the above in mind, one way to resume play is simply not to care about the possibility of discontinuity and either resume playing the live feed or resume playing using the recorded feed using, as a best guess of where the video was paused, the PTS of the last live frame that was displayed at the time of pause. For reasons set forth above this can result in undesired discontinuities that hinder viewing enjoyment.

A second way to resume play is to essentially never show the live feed, but rather to always display the video from the recorded stream as though it were the live feed. While this avoids discontinuities because the live feed is never used for display, it results in latency (delays) particularly if the user changes channels. With the above drawbacks in mind, the solutions herein have been provided.

SUMMARY OF THE INVENTION

The invention provides systems and methods for precisely associating and locating viewed digital content such as video frame with stored digital content using a pair of key information, namely, discontinuity counts and timestamps. The invention permits a user to precisely access any preferred video frame. Particular uses of the invention are in pausing and resuming play of a video stream, as well as bookmark operations for later access for viewing or editing. The digital data may be video or audio.

Accordingly, a television system includes a processor which associates at least one timestamp of at least one digital information element, such as a video frame, with at least one discontinuity count. A display presents digital data such as video streams from the processor, and a storage stores digital data such as video streams. The timestamp and discontinuity count are used by the processor for resuming play, using data in the storage, of a digital data stream such as a video stream that was paused or bookmarked during live play of the stream. The processor may be associated with a personal video recorder.

The preferred processor uses the timestamp and discontinuity count of a last-presented frame in a live video stream to resume play using video data in the storage. Video frames in the storage are associated with respective timestamps and video stream discontinuity counts.

In another aspect, a method for providing for smooth resumption of play of a video stream includes sending the stream to a decoder for live display of the stream on a display. Also, the method includes sending the stream to a storage for storage of the stream, with frames of the stream that are sent to the storage being associated with respective timestamps and video stream discontinuity counts. A "pause" command can be received, in which case the timestamp and discontinuity count of the paused frame are recorded. Upon receipt of a "resume play" command, using the timestamp and discontinuity count of the paused frame a frame is retrieved from the storage based on the frame having a discontinuity count matching the discontinuity count of the paused frame, and preferably based on the frame having the next sequential timestamp.

In still another aspect, a television system includes a TV display, a decoder driving the display, and means for sending a received video stream having time base discontinuities through the decoder for presentation thereof on the display. Means are provided for pausing the display. Also, the system includes means for sending a recorded version of the received video stream through the decoder for presentation thereof on the display upon resumption of play, with the means for sending a recorded version accounting for time base discontinuities in the stream.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
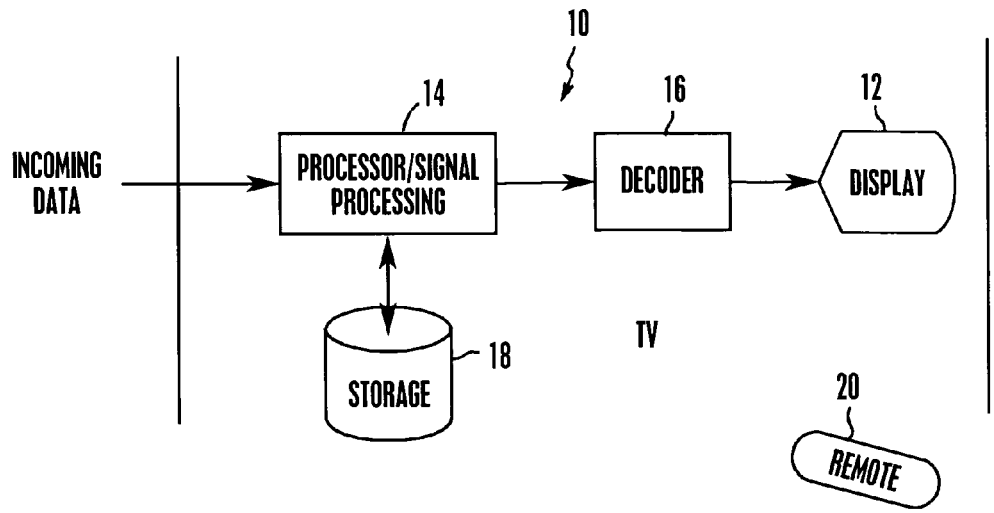
FIG. 1 is a block diagram of the system of the present invention.

Referring initially to FIG. 1, a television (TV) system is shown, generally designated 10, that includes an audio/video TV display 12 that conventionally receives, potentially through a processor or processors 14 that may be housed in a set-top box or personal video recorder (PVR), televised content from an antenna, satellite dish, cable, etc. for display of the content. The processor 14 alternatively can be incorporated into the housing of the display 12 to function in accordance with the disclosure herein, or it can be implemented by plural processors (e.g., one in a PVR and one in the TV or set-top box) acting in concert with each other. As shown in FIG. 1, the content from the processor 14 is decoded by a decoder 16 in accordance with principles known in the art prior to display. Also, content being viewed live on the display 12 may be recorded and stored on a storage 18, e.g., an optical or magnetic disk or other memory media that can be part of a PVR.

It is to be understood that the term "television" or "television system" encompasses any apparatus that has a television tuner and the below-described capability in a single housing or in separate housings that cooperate together. For instance, the processor 14 alternatively can be incorporated into a personal video recorder (PVR) that functions in accordance with the present invention, or even into a standalone computer such as a PC or laptop with its own monitor (not shown), and can communicate with the display 12 by wired or wireless link or simply by transferring data from the TV to the computer.

In the preferred non-limiting embodiment shown, the processor 14 may access one or more software or hardware elements to undertake the present logic.

Additionally, the processor 14 can be associated with a receiver for conventionally receiving control signals from a portable remote control device 20 that functions in accordance with principles known in the art. It is to be understood that while FIG. 1 shows that the device 20 can be a conventional TV remote control device, less preferably other devices can be used, such as but not limited to keyboards, keypads, mice, touch screen technology, voice activation/recognition technology, etc. Conventional channel, volume, and TV settings buttons (not shown) can also be provided. Using the remote 20, a user can, e.g., play a stream, record a stream, pause a stream, bookmark a location in a stream, etc.

The processor 14 executes the logic set forth herein. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 2:
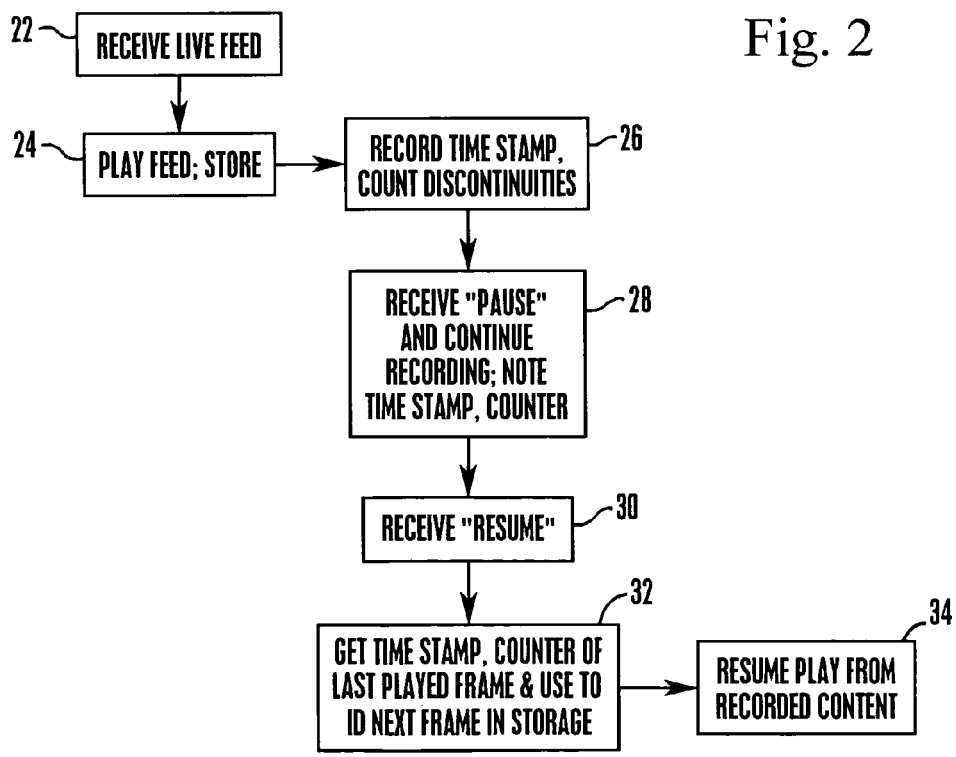
FIG. 2 is a flow chart of the present logic.

The logic of the present invention can be seen in reference to FIG. 2. Commencing at block 22, a video stream feed is received live from a source of video, e.g., from a cable or satellite transmitter head end or wirelessly from a broadcaster. At block 24, the live feed of the video stream is sent through the decoder 16 for display on the display 12. Also, the video stream is recorded by storing it in the storage 18.

Block 26 indicates that as the stream is stored, both the timestamps (e.g., PTS) of the frames and a count of discontinuities associated with the video segment of each frame are recorded or otherwise associated with the stored frames. More specifically, a counter that may be implemented by the processor 14 is initialized at zero at the start of receiving the stream to count up by ones for each time base discontinuity it detects in the stream. The counter value at the time a frame is recorded is associated with that frame, along with its timestamp, which may be obtained from the frame header.

In a preferred implementation counters are provided in the live feed (display) line and the recorded video line, so that the discontinuity count of the frame from the live stream being displayed is known, as is the count for all frames being stored in the storage 18. In the event that frames come unaccompanied by timestamps, timestamps may be calculated for the frames using a clock accessible by the processor 14. This preferred timestamp compensation guarantees that all the recorded frames have respective timestamp entries.

At block 28, a command to pause the video display may be received when, for example, a user appropriately manipulates the remote control device 20. The timestamp of the last-displayed frame along with its time base discontinuity count are recorded.

At block 30, a command to resume play is received, and the logic then moves to block 32 to look up the next frame at which video presentation will be resumed. To do this, the logic matches the discontinuity count of the last-displayed frame from the live video stream feed to the discontinuity count of a segment of frames in the storage 18, and then selects either the frame from the count-matching segment that has the same timestamp as the last-displayed frame or more preferably that has the next sequentially higher timestamp. Less preferably, frames having other timestamps close to the two mentioned above may be selected within the same segment.

Starting with the frame selected at block 32, the video stream stored in the storage 18 is sent to the decoder 16 at block 34 for resuming presentation of the video stream on the display 12 using the data that is recorded in the storage 18, without any discontinuities.

Figure 3:
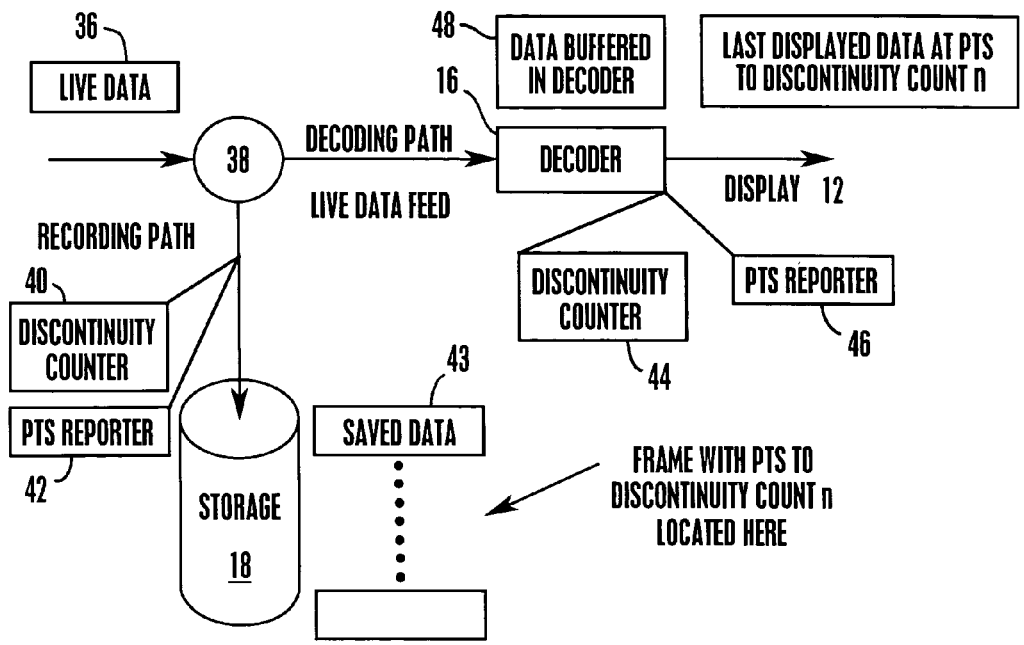
FIG. 3 is a schematic diagram illustrating the display process using the live video feed prior to entering a "pause" command, showing both logical and hardware system blocks and omitting some components for clarity that are not essential for understanding FIG. 3.
Figure 4:
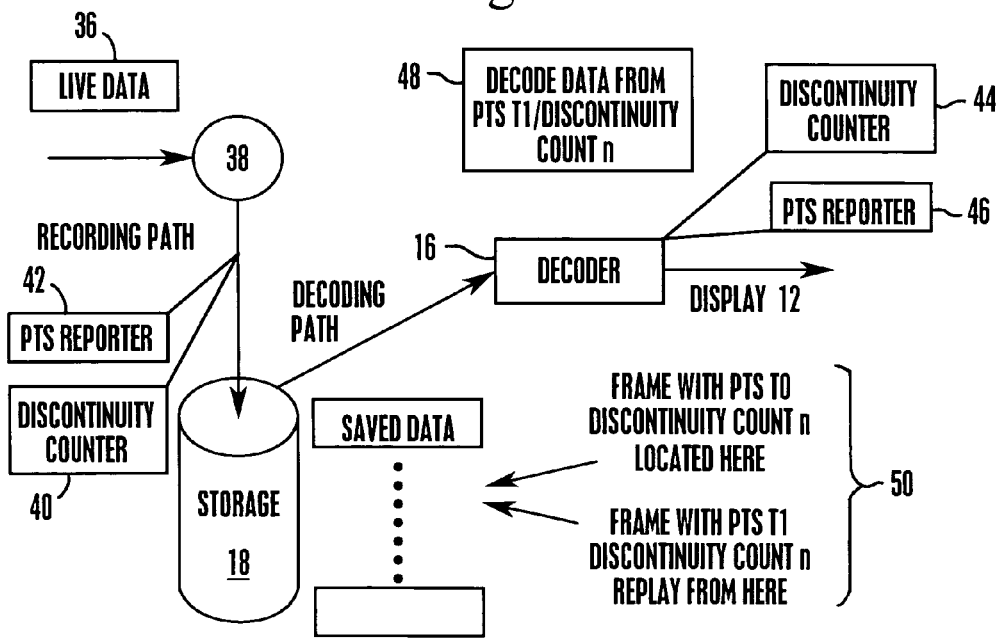
FIG. 4 is a schematic diagram of the display process using recorded video feed after entering a "pause" command followed by a "resume" command, showing both logical and hardware system blocks and omitting some components for clarity that are not essential for understanding FIG. 4.

The above process is illustrated in FIGS. 3 and 4. Reference numeral 36 in FIG. 3 represents the video stream that is received from the video source (referred to herein as the "live feed" or "live data"). At logical location 38 the live feed is sent both to the storage 18 along a recording path and to the decoder 16 for display along a decoding path. As the video stream is being recorded, blocks 40 and 42 in FIG. 3 show that a discontinuity counter in the recording path counts time base discontinuities in the stream (by observing such discontinuities in the stream in accordance with MPEG principles known in the art) while a timestamp reporter notes the timestamps in the headers of the frames of the stream. Also, as indicated at logical state 43, the video stream is stored frame by frame, with each frame being associated with its respective timestamp and with the count that the discontinuity counter 42 had when the particular frame was received.

Also, as shown in FIG. 3 a decoding path discontinuity counter 44 and timestamp reporter 46 note the timestamps and discontinuity count as the live feed is displayed. Note that in both FIG. 3 and FIG. 4 scenarios, the discontinuity counters 42, 44 at both the decode path and record path are reset to the same value when recording is commenced to guarantee discontinuity counting is synchronized between both paths.

As indicated at logical state 48, the data being displayed may be buffered in the decoder 16 if desired. When a "pause command" (or a bookmark command) is received, as indicated at 50 in FIG. 3 the timestamp and discontinuity count of the last-displayed frame (referred to for illustration as a frame having a timestamp of "t0" and discontinuity count of "n") is recorded.

FIG. 4 shows the same components as FIG. 3 after a command has been received to pause and then to resume play. As indicated at 50 in FIG. 4, the last-displayed frame (timestamp=t0, discontinuity count=n) is in the storage 18, as is the next successive video frame (i.e., timestamp=t1, discontinuity count=n). In the preferred embodiment play is resumed by sending, to the decoder 16 from storage 18, the next successive frame (timestamp =t1) in the same video segment as the last-displayed frame (indicated by having a matching discontinuity count=n).

While the particular SYSTEM AND METHOD FOR ASSOCIATING PRESENTED DIGITAL CONTENT WITHIN RECORDED DIGITAL STREAM AND METHOD FOR ITS PLAYBACK FROM PRECISE LOCATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A television system, comprising:
   at least one processor associating at least one timestamp of at least one digital data element with at least one discontinuity count;
   at least one display for presenting digital data streams from the processor; and
   at least one storage for storing digital data, wherein the timestamp and discontinuity count are used by the processor for resuming play, using data in the storage, of a digital data stream that was paused and/or bookmarked during live play of the stream, wherein video frames in the storage are associated with respective timestamps and video stream discontinuity counts, wherein if a frame comes unaccompanied by an associated timestamp, a timestamp is calculated for the frame, and further comprising a record discontinuity counter in a recording path and a decode discontinuity counter in a decoding path, and the counters are synchronized with each other.

2. The system of claim 1, wherein the processor is associated with a personal video recorder.

3. The system of claim 1, wherein the digital data element includes at least one video frame, and the processor uses the timestamp and discontinuity count of a last-presented video frame in a live video stream to resume play using video data in the storage.

4. A method for providing for smooth resumption of play of a digital stream, comprising:
   receiving the stream;
   sending the stream along a decoding path to a decoder for display of the stream on a display;
   sending the stream along a recording path to a storage for storage of the stream, frames of the stream sent to the storage being associated with respective timestamps and digital stream discontinuity counts;
   receiving at least one command representing at least one command in the group of: "pause", and "bookmark";
   recording a timestamp and discontinuity count of a paused and/or bookmarked frame;
   receiving a "resume play" command;
   using the timestamp and discontinuity count of the paused and/or bookmarked frame, retrieving a frame from the storage at least partially based on the frame having a discontinuity count matching the discontinuity count of the paused and/or bookmarked frame and
   synchronizing a discontinuity count in the recording path with a discontinuity count in the decoding path.

5. The method of claim 4, further comprising retrieving a frame from the storage based on the frame having a timestamp that matches the timestamp of the paused frame.

6. The method of claim 4, further comprising retrieving a frame from the storage based on the frame having a timestamp that is the next sequential timestamp after the timestamp of the paused frame.

7. The method of claim 4, comprising using a personal video recorder to execute at least some of the method acts.

8. The method of claim 4, comprising generating a timestamp for a frame arriving without a timestamp.

9. A television system, comprising:
   at least one TV display;
   at least one decoder driving the display;
   means for sending a received digital stream having time base discontinuities through the decoder for presentation thereof on the display;
   means for pausing and/or bookmarking the display;
   means for sending a recorded version of the received digital stream through the decoder for presentation thereof on the display upon resumption of play, the means for sending a recorded version accounting for time base discontinuities in the stream; and
   a record discontinuity counter in a recording path and a decode discontinuity counter in a decoding path, the counters being synchronized with each other.

10. The system of claim 9, wherein the means for sending a recorded version operates based at least in part on at least one timestamp of at least one frame of the digital stream.

11. The system of claim 10, wherein at least the means for sending a received digital stream and the means for sending a recorded version are embodied by at least one processor.

12. The system of claim 11, wherein the processor is associated with a personal video recorder.

13. The system of claim 11, wherein the processor uses the timestamp and discontinuity count of a last-presented frame in a live video stream to resume play using video data in a storage local to the processor.

14. The system of claim 13, wherein video frames in the storage are associated with respective timestamps and digital stream discontinuity counts.

15. The system of claim 10, wherein if a frame comes unaccompanied by an associated timestamp, a timestamp is calculated for the frame.

* * * * *